US009552530B2

(12) United States Patent
Guntur et al.

(10) Patent No.: US 9,552,530 B2
(45) Date of Patent: Jan. 24, 2017

(54) METHOD AND SYSTEM TO DETECT OBJECTS IN MULTIMEDIA USING NON-TEXTURAL INFORMATION WITHIN SEGMENTED REGION

(71) Applicant: Samsung Electronics Co., Ltd., Suwon-si, Gyeonggi-do (KR)

(72) Inventors: Ravindra Guntur, Mysore (IN); Mahesh Krishnananda Prabhu, Bangalore (IN); Vidhu Bennie Tholath, Bangalore (IN)

(73) Assignee: Samsung Electronics Co., Ltd., Suwon-si (KR)

( * ) Notice: Subject to any disclaimer, the term of this patent is extended or adjusted under 35 U.S.C. 154(b) by 323 days.

(21) Appl. No.: 14/509,467

(22) Filed: Oct. 8, 2014

(65) Prior Publication Data

US 2015/0139545 A1 May 21, 2015

(30) Foreign Application Priority Data

Nov. 15, 2013 (IN) .......................... 5260/CHE/2013
Feb. 7, 2014 (KR) ........................ 10-2014-0014383

(51) Int. Cl.
*G06K 9/46* (2006.01)
*G06T 7/20* (2006.01)
(52) U.S. Cl.
CPC ........... *G06K 9/4642* (2013.01); *G06T 7/2033* (2013.01); *G06T 2207/10016* (2013.01)

(58) Field of Classification Search
USPC ................................................ 382/103, 170
See application file for complete search history.

(56) References Cited

U.S. PATENT DOCUMENTS

| | | | | |
|---|---|---|---|---|
| 6,031,935 A * | 2/2000 | Kimmel | .................... | G06K 9/48 382/170 |
| 6,295,367 B1 * | 9/2001 | Crabtree | ............... | G01S 3/7865 382/103 |
| 6,335,985 B1 * | 1/2002 | Sambonsugi | ........ | G06K 9/3241 382/190 |
| 7,277,577 B2 * | 10/2007 | Ying | ................... | G06K 9/00201 382/168 |
| 8,243,987 B2 * | 8/2012 | Hampapur | ......... | G06K 9/00771 382/103 |
| 8,320,618 B2 * | 11/2012 | Ikenoue | .................. | G06T 7/208 348/169 |
| 8,395,676 B2 * | 3/2013 | Yamaoka | ........... | G06K 9/00369 348/222.1 |
| 2015/0077417 A1 * | 3/2015 | Kara | ....................... | G06T 17/10 345/420 |

* cited by examiner

*Primary Examiner* — Ishrat I Sherali
(74) *Attorney, Agent, or Firm* — Jefferson IP Law, LLP

(57) ABSTRACT

A method and a system for detecting and monitoring of at least one object in a multimedia content are provided. The method includes extracting at least one contour from the multimedia content using non-textural information in a segmented region within the multimedia content, computing a histogram for the extracted at least one contour in the segmented region of the selected multimedia content to represent an object shape based on the computed histogram, and determining an orientation change of the represented object shape within the segmented region of the multimedia content.

20 Claims, 11 Drawing Sheets

FIG. 10
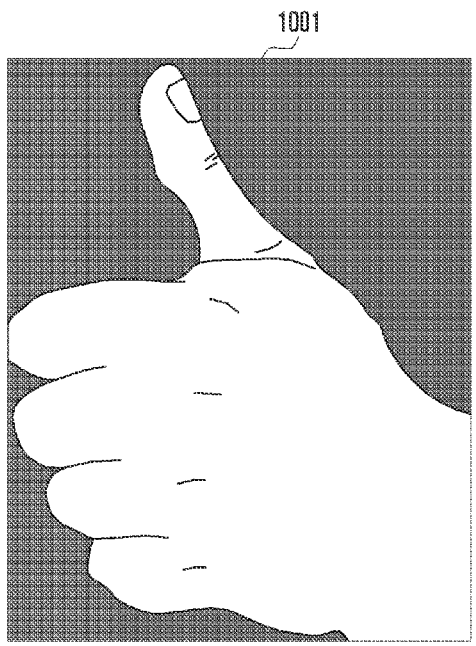
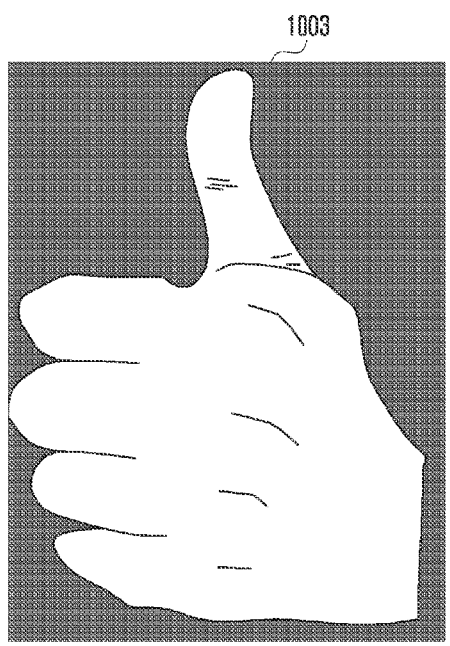
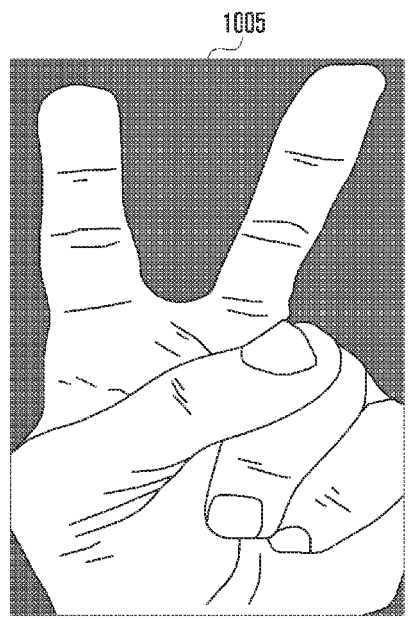
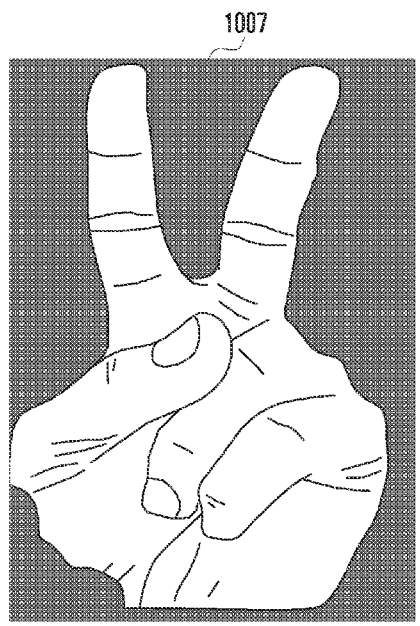

METHOD AND SYSTEM TO DETECT OBJECTS IN MULTIMEDIA USING NON-TEXTURAL INFORMATION WITHIN SEGMENTED REGION

CROSS-REFERENCE TO RELATED APPLICATION(S)

This application claims the benefit under 35 U.S.C. 119(a) of an Indian patent application filed on Nov. 15, 2013 in the Indian Property Office and assigned Serial number 5260/CHE/2013, and a Korean patent application filed on Feb. 7, 2014 in the Korean Intellectual Property Office and assigned Serial number 10-2014-0014383, the entire disclosure of each of which is hereby incorporated by reference.

TECHNICAL FIELD

The present disclosure relates to detecting at least one object in multimedia content. More particularly the present disclosure relates to detecting, tagging, and matching at least one object in an image or video using non-textural information of the object.

BACKGROUND

Currently, many feature-based methods are available to detect objects in a multimedia content, wherein textural information of the object is used, and the method efficiently detects only regular objects in the multimedia content.

However, when the objects in the multimedia content constantly change their shapes and orientation in successive frames, existing feature-based methods do not track these constantly changing objects by considering the orientation changes of the object shapes. Also, the feature-based method fails to detect and track non-regular objects accurately and efficiently present in the multimedia content. The feature-based method, may provide an enriching experience for the multimedia users by adopting a value added service in the method.

The above information is presented as background information only to assist with an understanding of the present disclosure. No determination has been made, and no assertion is made, as to whether any of the above might be applicable as prior art with regard to the present disclosure.

SUMMARY

Aspects of the present disclosure are to address at least the above-mentioned problems and/or disadvantages and to provide at least the advantages described below. Accordingly, an aspect of the present disclosure is to provide a method to detect at least one object in multimedia content using non-textural information of the object.

Another aspect of the disclosure is to provide the method to recognize change in orientation of at least one object.

Another aspect of the disclosure is to provide the method to recognize at least one deformed object in successive video frames.

Another aspect of the disclosure is to match at least one object in an image or a video with a represented object and replace the matching object with the represented object.

In accordance with an aspect of the present disclosure, a method for detecting and monitoring at least one object in a multimedia content is provided. The method includes extracting at least one contour from the multimedia content using non-textural information in a segmented region within the multimedia content, computing a histogram for extracted at least one contour in the segmented region of the selected multimedia content to represent an object shape based on the computed histogram, and determining an orientation change of the represented object shape within the segmented region of the multimedia content.

In accordance with another aspect of the present disclosure, a system for detecting and monitoring of at least one object in a multimedia content is provided. The object analyzer module configured to extract at least one contour from the multimedia content using non-textural information in a segmented region within the multimedia content and to compute a histogram for the extracted at least one contour in the segmented region of the selected multimedia content to represent an object shape based on the computed histogram, and an object tracking and replacing module configured to determine an orientation change of the represented object shape within the segmented region of the multimedia content.

In accordance with another aspect of the present disclosure, a non-transitory computer readable storage medium with a computer program stored thereon when executed by an integrated circuit further including at least one processor performs a method for detecting and monitoring of at least one object in a multimedia content is provided. The method includes extracting at least one contour from the multimedia content using non-textural information in a segmented region within the multimedia content, computing a histogram for the extracted at least one contour in the segmented region of the selected multimedia content to represent an object shape based on the computed histogram, and determining an orientation change of the represented object shape within the segmented region of the multimedia content.

Other aspects, advantages, and salient features of the disclosure will become apparent to those skilled in the art from the following detailed description, which, taken in conjunction with the annexed drawings, discloses various embodiments of the present disclosure.

BRIEF DESCRIPTION OF THE DRAWINGS

The above and other aspects, features, and advantages of certain embodiments of the present disclosure will be more apparent from the following description taken in conjunction with the accompanying drawings, in which:

FIG. 10 illustrates an example of detecting similar object shapes in a segmented region of multimedia content according to an embodiment of the present disclosure.

Throughout the drawings, it should be noted that like reference numbers are used to depict the same or similar elements, features, and structures.

DETAILED DESCRIPTION

Figure 1:
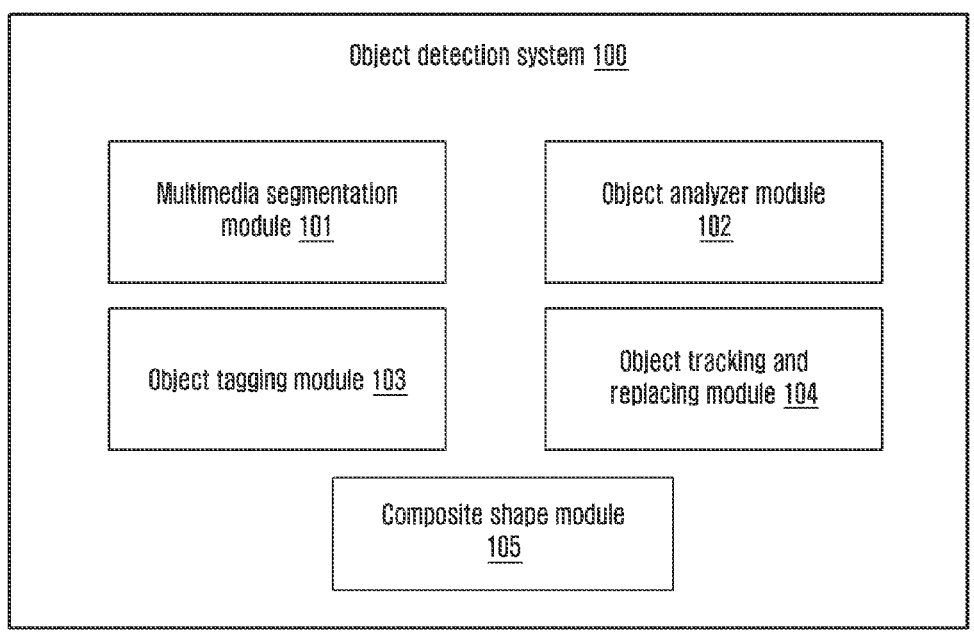
FIG. 1 illustrates a system overview to implement a method of detecting, tagging, and matching at least one object in multimedia content with the represented object shape using non-textural information of the multimedia content according to an embodiment of the present disclosure.

The following description with reference to the accompanying drawings is provided to assist in a comprehensive understanding of various embodiments of the present disclosure as defined by the claims and their equivalents. It includes various specific details to assist in that understanding but these are to be regarded as merely exemplary. Accordingly, those of ordinary skill in the art will recognize that various changes and modifications of the various embodiments described herein may be made without departing from the scope and spirit of the present disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the present disclosure. Accordingly, it should be apparent to those skilled in the art that the following description of various embodiments of the present disclosure is provided for illustration purpose only and not for the purpose of limiting the present disclosure as defined by the appended claims and their equivalents.

It is to be understood that the singular forms "a," "an," and "the" include plural referents unless the context clearly dictates otherwise. Thus, for example, reference to "a component surface" includes reference to at least one such surface.

The various embodiments herein achieve a method and system for detecting and monitoring at least one object in multimedia content using non-textural information in a segmented region in the multimedia content. Further, the method recognizes change in orientation of object shapes to match with a representative object shape stored in a database after performing an affine transformation on the represented object shape. Further, the method recognizes at least one deformed object shape in successive video frames and replaces the deformed objects with a nearly matching represented shape by optionally applying the affine transformation for the matching object shape.

In an embodiment, monitoring at least one object in the segmented region of the multimedia content comprises of tracking, matching, and replacing at least one object in the multimedia content.

In an embodiment, the multimedia content includes but not limited to an image, a video and the like. Further, the video object comprises a sequence of frames.

For example, the image is a simple graphical element and the objects are assembled together to create more complex artworks like icons, cursors, buttons or the like. The image object represents metadata for an image.

For example, the video is an aggregate of metadata and asset information associated with the video.

In an embodiment, a segmentation of the multimedia content is the process of partitioning the image or the video into multiple segments (sets of pixels, also known as super pixels).

Throughout the document, the term object refers to the multimedia object.

In an embodiment, an object shape corresponds to an object contour identified in the segmented region of the multimedia content.

In an embodiment, the object contour determines an outline for the segmented region. Further, there may be at least one extracted contour in the segmented region of the multimedia content.

In an embodiment, the multimedia may be supported on a device that includes, but is not limited to, a mobile phone, a laptop, a tablet, a personal computer, a digital media player, an electronic watch, a camera, or any other electronic device with the capability to capture an image or a video and store the captured images and video for further processing.

In an embodiment, the non-textural information of the image or the video considers shape as a critical factor for analysis purpose in the proposed method.

In an embodiment, the detected object in the multimedia content may be represented with an object shape that is stored in the database and may be tagged with a shape name for reference.

In an embodiment, the affine transformation is a combination of single transformations such as translation or rotation or reflection on an axis of a coordinate system.

A histogram bar is a graphical representation of the number of pixels in the image object or the video object determined as a function of their intensity. In the proposed method, the pixels are replaced by angle or distance. Thus, the bar represents the number of times an angle or number of times a line of length found in the objects of the image or the video.

Referring now to the drawings, and more particularly to FIGS. 1 through 11, where similar reference characters denote corresponding features consistently throughout the figures, there are shown preferred various embodiments.

FIG. 1 illustrates a system overview to implement a method of detecting, tagging, and matching at least one or more object in a multimedia content with the represented object shape using non-textural information of the multimedia content according to an embodiment of the present disclosure.

Referring to FIG. 1, an object detection system 100 comprises the following modules: a Multimedia segmentation module 101, an object analyzer module 102, an object tagging module 103, an object tracking and replacing module 104, and a composite shape module 105.

The Multimedia segmentation module 101 is configured to select and segment the multimedia content as required for further processing.

In an embodiment, the Multimedia segmentation module 101 uses any of the existing approaches to segment the multimedia content. For example, following approaches are commonly used for segmentation: threshold techniques, edge-based methods, region-based techniques, and connectivity-preserving relaxation methods.

Further, at least one multimedia segmented region is provided as input to the object analyzer module 102 for representing the object shape using the non-textural information of the segmented region.

The object analyzer module 102 is configured to receive the segmented region from the segmentation module 101, and extract at least one contour for each of the segmented region in the selected multimedia content. Further, the object analyzer module 102 extracts the coordinates of each pixel by traversing the extracted contours either in a clockwise direction or in a counter-clockwise direction. Further, the object analyzer module 102 computes a normalized histogram by calculating angles of lines joining coordinates of selected points on the contours and calculating the distance of the line joining coordinates of selected points on the contours. Further, the object analyzer module 102 keeps track of the number of times each angle is encountered after quantizing the angle at 1 degree space.

In an embodiment, the object analyzer module 102 is configured to determine the object shape of each contour based on the computed normalized histogram, and stores the determined shapes in the database or in a structure such as a queue or an array. The determined object shapes are stored in the database or in the structure are referred to as representative shapes.

Consider a scenario in which the object shape in the segmented region of the multimedia content may change from one orientation to another orientation. As a result the computed histograms for the orientation changed shapes do not match. In order to match the orientation changed object as a histogram, rotation of the object shape is performed by circular shift of the histogram bins.

The object analyzer module 102 is configured to perform a circular shift on the histogram 360 times in steps of 1 in each histogram bin and re-computes similarity for each object shape and is represented as a normalized histogram. Further, the object analyzer module 102 is configured to match the multimedia segmented region object with all the shapes in the database by performing circular shift on the normalized histogram.

Further, the object analyzer module 102 is configured to store the angle (shift) and the object shape in the database where the correlation is the highest in the database.

In an embodiment, matching the multimedia segmented region with the represented shape stored in the database is performed using any of the known techniques such as a normalized cross-correlation, a cosine distance or the like.

In an embodiment, if the multimedia segmented region consists of at least one composite shape, the object analyzer module 102 computes the histogram values for each of the composite shapes and combines the histograms of the composite shape regions into a single histogram. Further, the object analyzer module 102 sorts the histogram value in a specific order to enable faster selection of the representing object shape considering a shift or orientation of the matching object shape.

As the object analyzer module 102 represents the object shape in the database, a name for the shape is tagged using the object tagging module 103. Further, the object tagging module 103 is configured to calculate and store the number of similar shapes encountered within the multimedia segmented region.

The object tagging module 103 is configured to represent the object shape with the shape name considering the contour of the object shape and position of the object shape in the multimedia segmented region. For example, the multimedia segmented region with a bounded rectangle is tagged with a rectangle name along with a centroid coordinate for this rectangle. Further, the object tagging module 103 identifies the similarity between two multimedia objects based on the number of identical object shapes determined between the two multimedia objects.

After representing the objects shapes by matching the number of similar object shapes encountered within the multimedia segmented region, the object tracking and replacing module 104 initializes an existing tracking technique such as an LK-Tracker around the multimedia segmented region encompassing a detected object shape.

In an embodiment, the object tracking and replacing module 104 is configured to track the composite region in successive video frames and marks variations in the tracked region. Further, the object tracking and replacing module 104 applies the variations in the tracked region to the object shape region within the tracked region based on previous frame of the object shape region.

In an embodiment, the variation is handled by the object tracking and replacing module 104 by scaling the shape region and replacing the tracked region with the scaled object shape.

In another embodiment, the variation is handled by the object tracking and replacing module 104 by performing a geometric transform on the object shape region and replacing the tracked region with the transformed shape.

In an embodiment, the object tracking and replacing module 104 replaces the object shape in the tracked region with a similar object shape as an overlay by varying the position and the object shape as defined by the shape variations detected in the video.

In an embodiment, all the object shapes in the multimedia segmented region are detected, tagged, and tracked in a server using the modules described above. Further, the object tracking and replacing module 104 generates a metadata file which describes about rendering image based on the changing shape of the objects in the image.

In another embodiment, if the object tracking and replacing module 104 loses track of the multimedia segmented region, then the tracking algorithm re-initializes the shape detection by re-computing the histogram value for the multimedia segmented region.

The composite shape module 105 is configured to check if the multimedia segmented region contains concentric shapes or composite shapes. Also, the composite shape module 105 is configured to determine whether these concentric shapes are of the same type or not.

In an embodiment, the composite shape module 105 is configured to merge the concentric shapes by merging a smaller shape into a larger shape. For every concentric shape detected in the segmented region of the multimedia content, the method identifies the centroid and the size of the shape.

Further, the object tracking and replacing module 104 replaces the smaller shape with the larger one. In concentric shapes, of different types (say circle and rectangle) the object tracking and replacing module 104 chooses the shape that has the best replacement image candidate. Further, the composite shape module 105 is configured to associate the non-textural information of the objects with the textural information of the objects in the segmented region of the multimedia content to determine the closest match of the represented object shapes stored in the database.

In an embodiment, if the method detects standard object shapes that are randomly rotating in the multimedia content, in such a scenario, the method considers the circular objects to have a constant orientation and non-circular objects to have changed the orientation.

Figure 2:
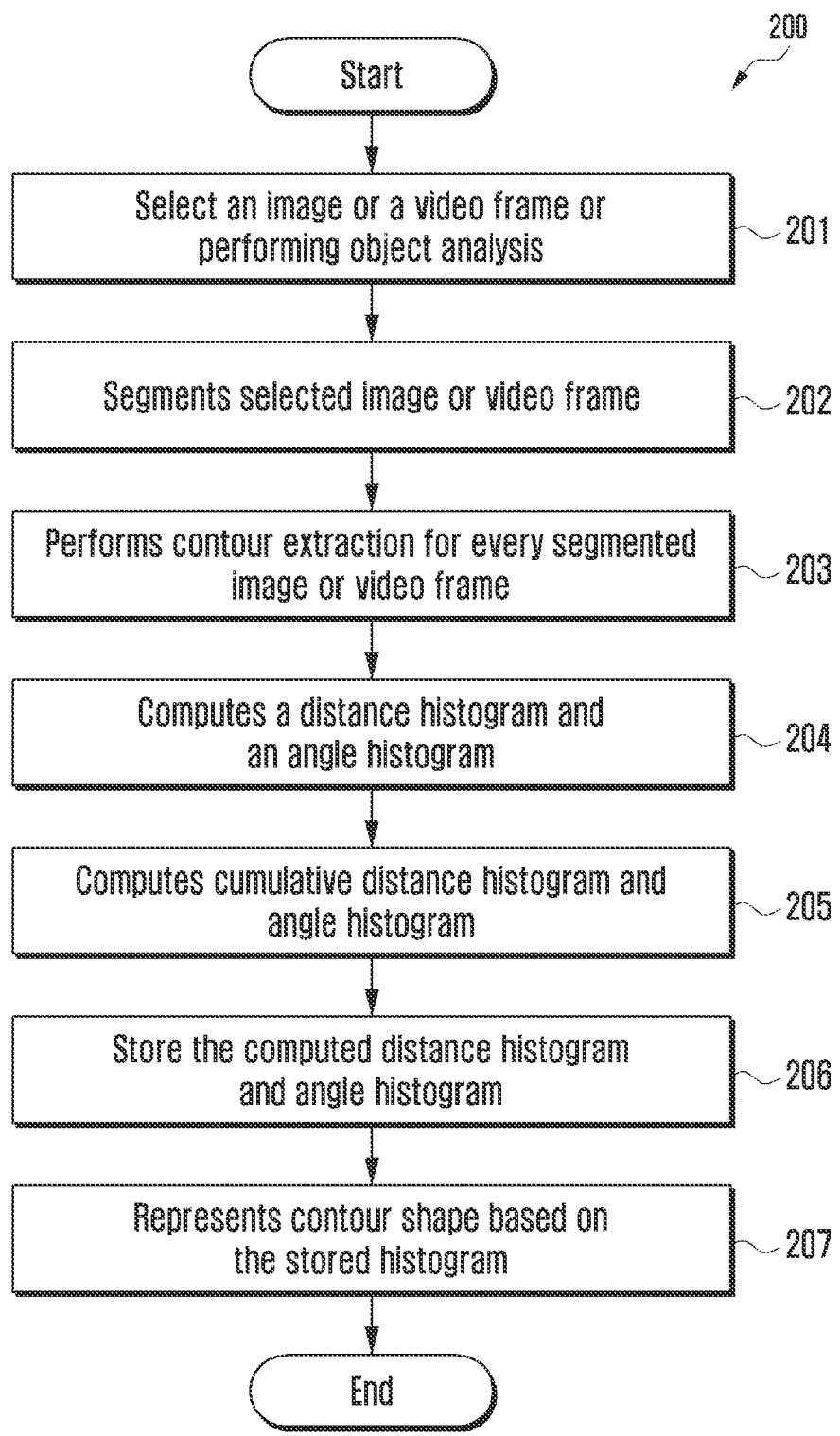
FIG. 2 illustrates a flow diagram explaining a method of computing histograms to represent an object shape in a segmented region of multimedia content according to an embodiment of the present disclosure.

FIG. 2 illustrates a flow diagram explaining a method of computing histograms to represent an object shape in the multimedia segmented region according to an embodiment of the present disclosure.

Referring to FIG. 2, in a flow diagram 200, initially the method selects at operation 201 the multimedia content for detecting at least one object using non-textural information in the segmented region of the multimedia content. Further, the method performs at operation 202 the multimedia segmentation using any of the existing segmentation approaches such as a watershed method, an edge-based method, a region-based technique, a connectivity-preserving relaxation method and the like.

In an embodiment, the method uses the Multimedia segmentation module 101 to segment the selected multimedia content.

After segmenting the selected multimedia content, the method extracts at operation 203 at least one contour for each of the segmented region in the multimedia content. For each of the extracted contours, the method computes at operation 204 a distance histogram and an angle histogram. The method computes a distance histogram and an angle histogram by extracting the coordinates of each pixel after traversing each contour in the multimedia segmented region either in a clockwise direction or in a counter-clockwise direction. Further the method computes a normalized histogram by calculating angles of lines joining coordinates of selected points on the contours and calculating the distance of the line joining coordinates of selected points on the contours. Further, the method tracks the number of times each angle is encountered after quantizing the angle at 1 degree space. The method computes the distance histogram and the angle histogram for every contour extracted in the multimedia segmented region. Additionally, the method computes at operation 205 a cumulative distance histogram and a cumulative angle histogram values for the contours extracted in the multimedia segmented region.

In an embodiment, a cumulative histogram is computed for composite shapes that are extracted in the multimedia segmented region, and the cumulative histogram is a single histogram value computed by combining composite shape histogram values.

In an embodiment, the method computes the histogram and the cumulative histogram using the object analyzer module 102.

Further, the method stores at operation 206 the computed distance and angle histogram in the database or in a structure such as a queue or an array. Further, the method determines at operation 207 the shape of each contour based on the normalized histogram stored in the database.

In an embodiment, the method determines the object shapes in the multimedia content using the object analyzer module 102.

The various actions in as depicted in FIG. 2 may be performed in the order presented, in a different order or simultaneously. Further, in some various embodiments, some actions listed in FIG. 2 may be omitted.

Figure 3:
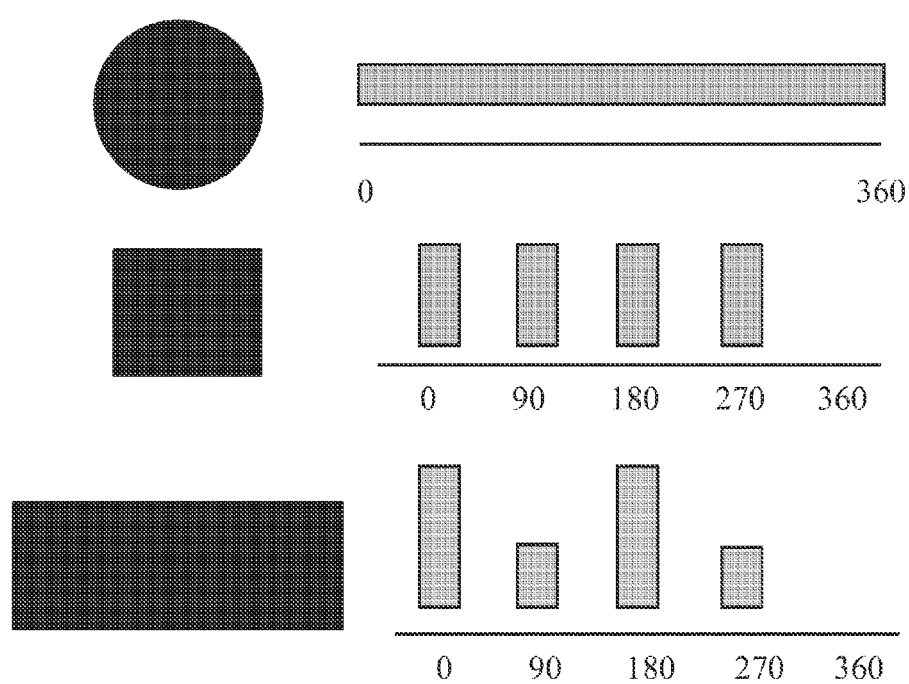
FIG. 3 illustrates an example histogram bar that represents an object shape in a segmented region of multimedia content according to an embodiment of the present disclosure.

FIG. 3 illustrates an example histogram bar that represents an object shape in a segmented region of multimedia content according to an embodiment of the present disclosure.

Referring to FIG. 3, a histogram bar represents a shape of the contour in a graphical form. The two-dimensional histogram shown in the figure depicts the angles supported between a pair of pixels selected on the contour and the length of distance between a pair of pixels selected on the contour. Based on these computed histogram values (depicted as the histogram bar) the method determines the shape of the contour.

For example, a circle shape has a pair of pixels whose angle may start measuring at 0 degrees and end at 360 degrees, computed from the center of the circle (x=0, y=0). The x-axis denotes the angle computed for a pair of pixels on the contour. Further, the distance between a pair of pixels for the circle contour remains constant, which is depicted by the width of the histogram bar. The y-axis denotes the length of the distance between the pair of pixels on the contour.

Figure 4:
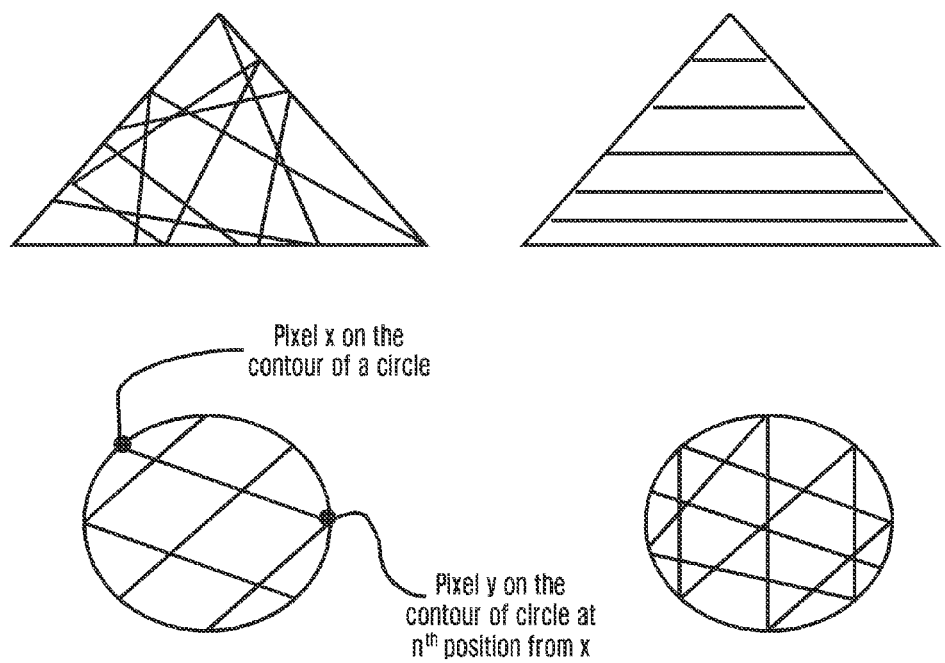
FIG. 4 illustrates an example to compute angles of line joining coordinates of selected points on a contour and to compute a distance of the line joining coordinates of selected points on the contour according to an embodiment of the present disclosure.

FIG. 4 illustrates an example to compute angles of line joining coordinates of selected points on a contour and to compute a distance of the line joining coordinates of selected points on the contour according to an embodiment of the present disclosure.

Referring to FIG. 4, initially the method extracts at least one contour in the segmented region of the multimedia content. Further, the method computes the distance histogram and the angle histogram for each of the contours extracted in the segmented region of the multimedia content. The method traverses the extracted contours either in the clock-wise direction or in the counter-clockwise direction and extracts the pair of pixels on each of the contours. Further, the method computes the histogram for each of the contours by computing the angle between the pair of pixels and by computing the distance between the pair of pixels extracted on the contour.

For example, the figure depicts a circle contour as one of the contours in the segmented region of the multimedia content. The method extracts a pair of pixels (x, y) on the triangle contour in a specific pattern (linear pattern, random pattern) and computes the histogram for the triangle contour by calculating the angle between the pair of pixels (x, y) and by calculating the distance between the pair of pixels (x, y) extracted on the contour. As depicted in the figure, the method selects the pixel y at the nth position from the pixel x on the circle contour.

Figure 5:
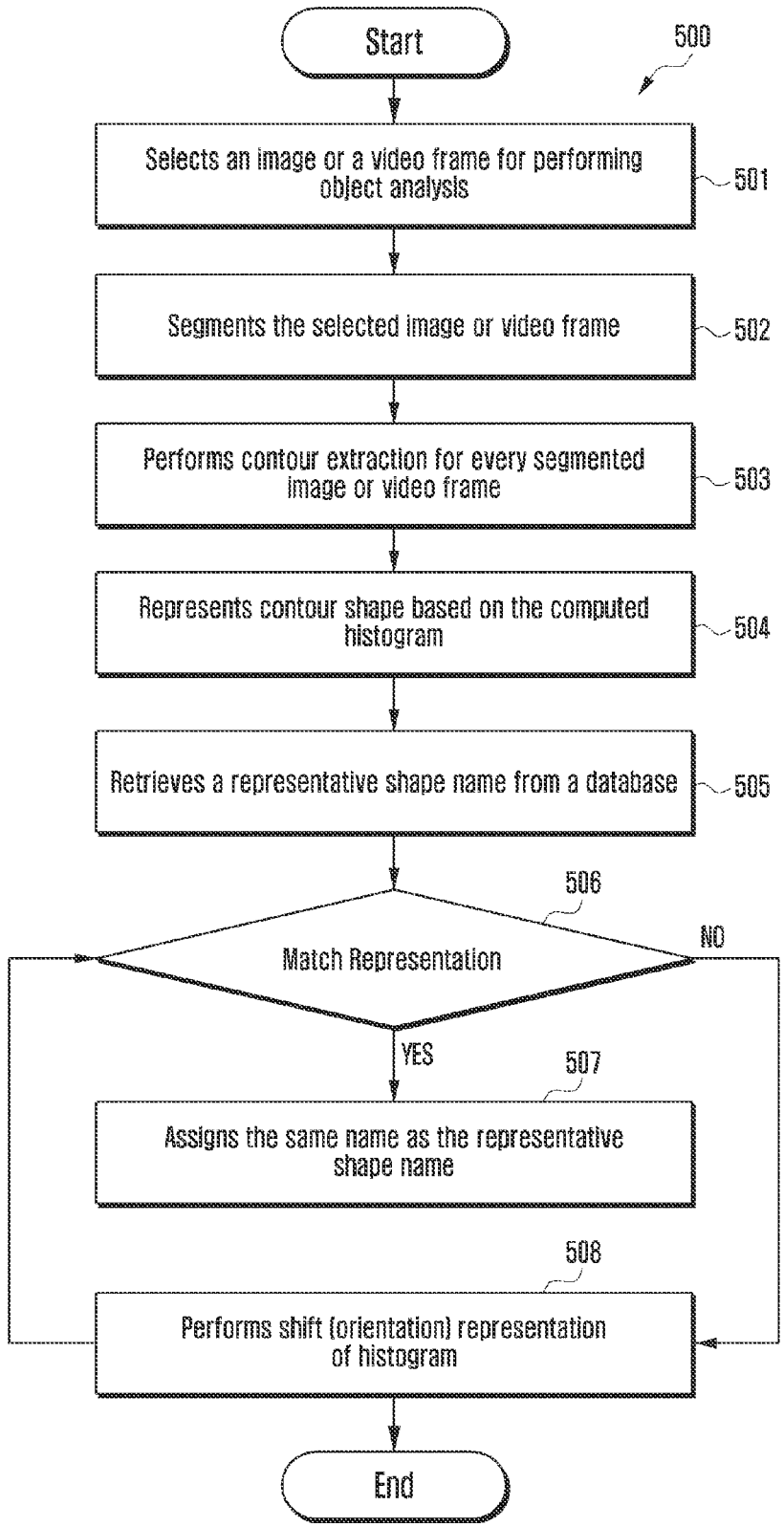
FIG. 5 illustrates a flow diagram explaining a method of matching an object shape in a segmented region of multimedia content with a representative object shape stored in a database by computing rotation shift on stored histogram values according to an embodiment of the present disclosure.

FIG. 5 illustrates a flow diagram explaining the method of matching the object shape in the segmented region of the multimedia content with a representative object shape stored in a database by computing rotation shift on stored histogram values according to an embodiment of the present disclosure.

Referring to FIG. 5, in a flow diagram 500, initially the method selects at operation 501 the multimedia content for performing an object analysis using the non-textural information of the object in the segmented region of the multimedia content. Further, the method performs at operation 502 the multimedia segmentation using any of the existing segmentation approaches such as a watershed method, an edge-based method, a region-based technique, a connectivity-preserving relaxation method or the like.

In an embodiment, the method segments the multimedia content using the Multimedia segmentation module 101.

After segmenting the multimedia content, the method extracts at operation 503 contours for each of the segmented region in the selected multimedia content. For each of the extracted contours, the method computes at operation 504 a distance histogram and an angle histogram. The method computes a distance histogram and an angle histogram by extracting the coordinates of each pixel after traversing each contour in the segmented region either in a clockwise direction or in a counter-clockwise direction. The method computes a normalized histogram by calculating angles of lines joining coordinates of selected points on the contours and calculating the distance of the line joining coordinates of selected points on the contours. Further, the method represents the shape of the object by using the computed histogram and stores the determined shape in the database. If the method finds a matching object in the database, then the shape name of the matching object is retrieved at operation 505 from the database.

In an embodiment, the method computes and determines the shape of the object in the segmented region of the multimedia content by using the object analyzer module 102.

In an embodiment, the method tags the object shape with a shape name by using any of the existing approaches to translate the multimedia objects to text format. For example, the triangle contour is stored with a shape name as triangle along with the location coordinates (x, y) of the triangle.

In an embodiment, the method tags the object shape using the object tagging module 103.

Further, as the method tracks the segmented region in the multimedia content and determines at operation 506 match representation of shape stored in the database, if the method finds the match with the represented shape at operation 507 then the tracked segmented region is assigned with the same shape or shape name as stored in the database.

Further, if the method tracks the segmented region and does not find a matching representation or shape name stored in the database, then the method performs at operation 508 a 360 degree rotation of the shape for each contour by quantizing the rotation angle by 1 degree space.

In an embodiment, the method tracks at least one object in the multimedia content using the object tracking and replacing module 104.

In an embodiment, each rotated object shape generalized into the histogram of angular variations is stored as an ordered list for the segmented region in the multimedia content.

Further, as the method detects the exact match of the object shape or shape name after performing the shape rotation, the matching shape or shape name along with the rotation angle is saved in the database. The various actions in as depicted in FIG. 5 may be performed in the order presented, in a different order or simultaneously. Further, in some various embodiments, some actions listed in FIG. 5 may be omitted.

Figure 6:
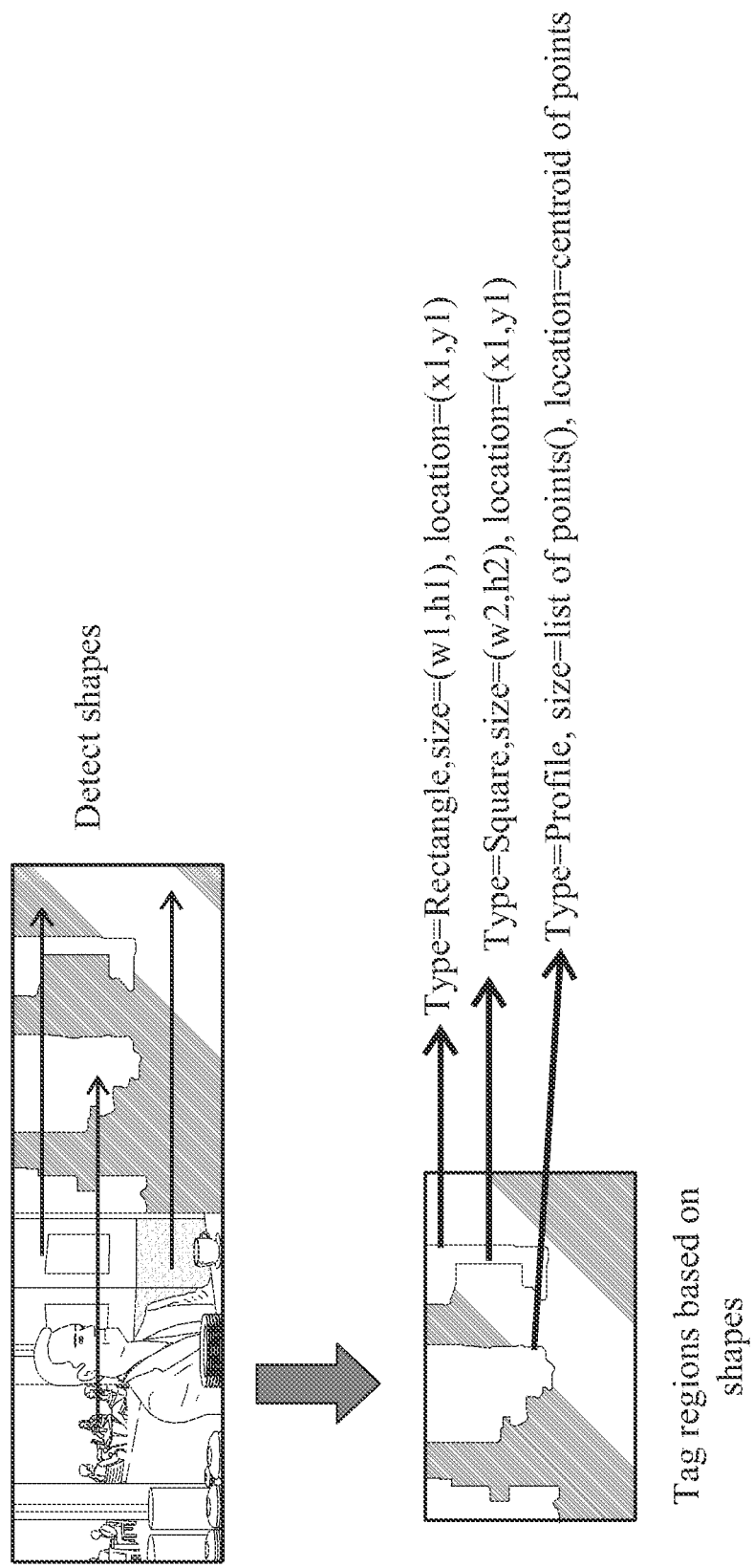
FIG. 6 illustrates an example for tagging an object in a segmented region of multimedia content with a shape name and associating a tagged object with a corresponding size and location coordinates according to an embodiment of the present disclosure.

FIG. 6 illustrates an example for tagging an object in a segmented region of multimedia content with a shape name and associating the tagged object with a corresponding size and location coordinates according to an embodiment of the present disclosure.

Referring to FIG. 6, initially the method segments the region in the selected multimedia content and extracts at least one contour in the segmented region of the multimedia content. Further, the method traverses each of the contours in the segmented region either in the clock-wise direction or in the counter-clockwise direction and determines the shape of the contour by computing the histogram for each of the contours in the segmented region of the multimedia content. For example, the segmented region shown in the figure contains three extracted contours: a rectangle contour with a size (width w1, height h1) and location of the contour (x1, y1), a square contour with the size (width w2, height h2) and location of the contour (x2, y2), and a profile contour with a list of points and a centroid point for the profile contour.

Figure 7:
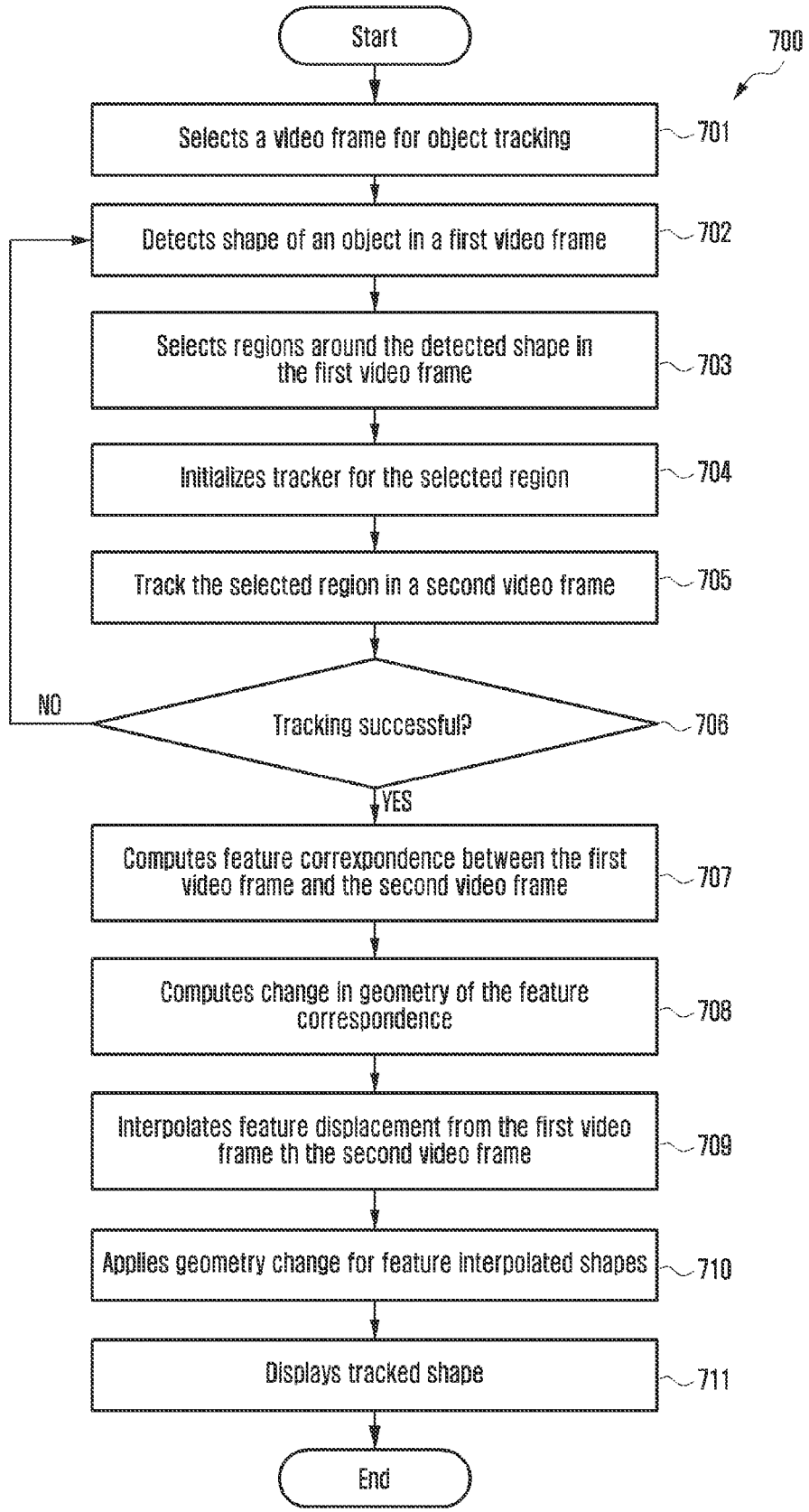
FIG. 7 illustrates a flow diagram explaining a method of tracking a video objects in successive video frames and replacing deformed objects by interpolating feature displacement between two successive video frames according to an embodiment of the present disclosure.

FIG. 7 illustrates a flow diagram explaining a method of tracking video objects in successive video frames and replacing deformed objects by interpolating feature displacement between two successive video frames according to an embodiment of the present disclosure.

Referring to FIG. 7, as depicted in a flow diagram 700, initially the method selects at operation 701 the video frame for tracking the objects and performs the video frame segmentation using the Multimedia segmentation module 101. Further, the method computes the histogram in the segmented region by extracting at least one contour in the segmented region of the multimedia content. Based on the computed histogram value for each of the contours in the segmented region, the method detects at operation 702 the shape of the contours in the segmented region of the first video frame.

In an embodiment, the method detects the shape of the contours in the segmented region of the multimedia content using the object analyzer module 102.

Further, the method selects at operation 703 the region to be tracked around the detected shape in the first video frame and initializes at operation 704 the tracker for the selected region.

In an embodiment, method tracks at least one object in the multimedia content using the object tracking and replacing module 104.

The initialized tracker tracks at operation 705 a successive video frame (a second video frame) in the selected region and around the detected shape without having to identify the shape again.

In an embodiment, the initialized tracker combines a color based tracking method and a feature-based tracking method to track the selection region. Further, the tracker checks at operation 706 if tracking the object is successful or not based on the tracking confidence of the detected shapes. If the tracking confidence is high, the corners of the detected shapes are determined using an existing method like harris-corner. The relative positioning (triangular distance between immediate neighbors) of corners in the first video frame and the second video frame is computed. If the ordering is the same as the first video frame, then the method determines that the detected shape has not changed for the contour. Further, the method may also consider change in size alone for the detected shape which has the tracking confidence as high. Further, the method tags the same name of the original object shape for the resized object shape.

Further, if the tracking confidence is low, then the method computes at operation 707 a feature correspondence between the first video frame and the successive video frame in the tracked region of the multimedia content by using any of the existing method.

Further, based on the feature correspondence between the first and the successive video frame, the method determines at operation 708 if the tracked region has encountered a geometrical change in the tracked region of the multimedia content.

In an embodiment, the method interpolates at operation 709 the feature displacement between the first video frame and the successive video frame in the tracked region of the multimedia content by using the object tracking and replacing module 104.

Further, the method applies at operation 710 the geometrical change for the interpolated feature displacement by determining the relative ordering of the angular variations in the ordered list of the object shape and computing the affine transformation that has undergone change in the tracked region. Further, the affine transformed object is tagged with a new shape name and the method may use the affine transformed object to match with other similar object.

In an embodiment, the affine transformed object in the multimedia content may be tagged with the shape name using the object tagging module 103.

Further, the method replaces and displays at operation 711 the affine transformed object in the tracked region of the multimedia content.

In another embodiment, if the method determines that the object shape is a non-regular shape (detected based on the histogram of angles) then the method identifies the nearest regular object shape that may fit into the non-regular shape and this region is tagged with the name of the regular shape.

Figure 8:
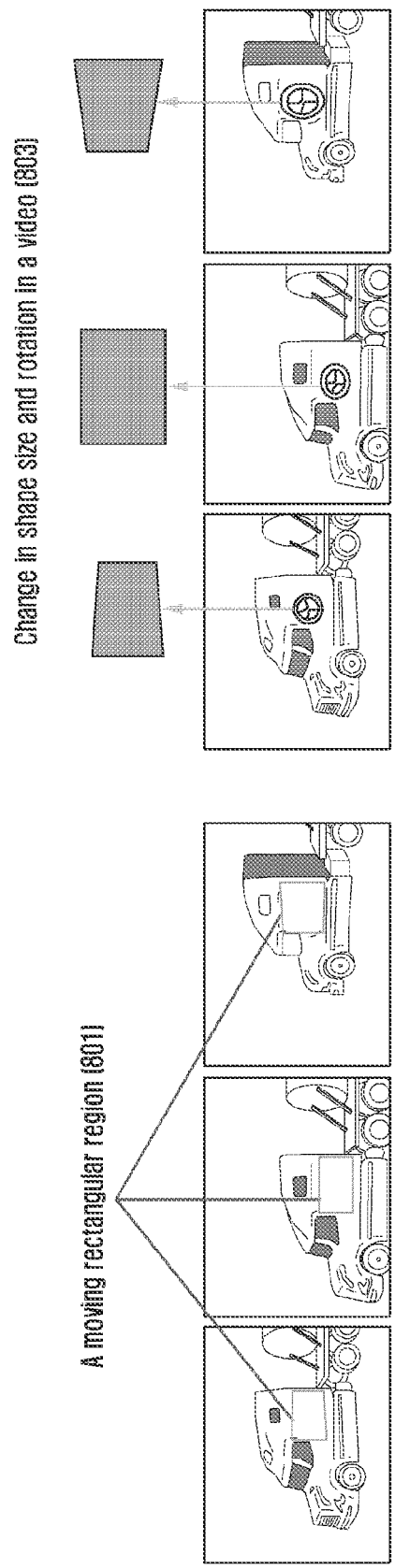
FIG. 8 illustrates an example of tracking video objects in successive frames and constraining deformed objects by interpolating feature displacement between two successive video frames according to an embodiment of the present disclosure.

FIG. 8 illustrates an example of tracking video objects in successive frames and constraining deformed objects by interpolating feature displacement between two successive video frames according to an embodiment of the present disclosure.

Referring to FIG. 8, initially the method selects the video frame for tracking at least one object shape in the segmented region of the video frame. Further, a region is selected around the object shape to initialize a tracker to track the selected region. Further, if the tracker does not track the object shape in the selected region the method computes the change in geometric shape of the object by using any of the known techniques. Further, the method interpolates position of the object shape from the first video frame to the successive video frame and computes affine transformation for the interpolated object shape. Further, the method replaces the interpolated object shape with the affine transformed object shape. For example, initially a truck video is selected and the periphery of the truck is detected as the tracking region. Further a tracker is initialized to track the truck periphery, as the truck starts moving towards a different direction, the tracking confidence is set to low since the tracked region is affine transformed. Further, the method starts interpolating the tracked region for affine transformation and computes the geometrical displacement of the tracked region shapes. In the current tracked region, the method interpolates the rectangular shape in the tracked region and determines that the rectangular shape has undergone a geometrical shape change. Further, the method computes and determines a trapezoidal shape in the tracked region after applying affine transformation. Further, the method matches the trapezoidal shape with the represented shape stored in the database and replaces the logo that fits in the trapezoidal region in the successive video frame.

Figure 9:
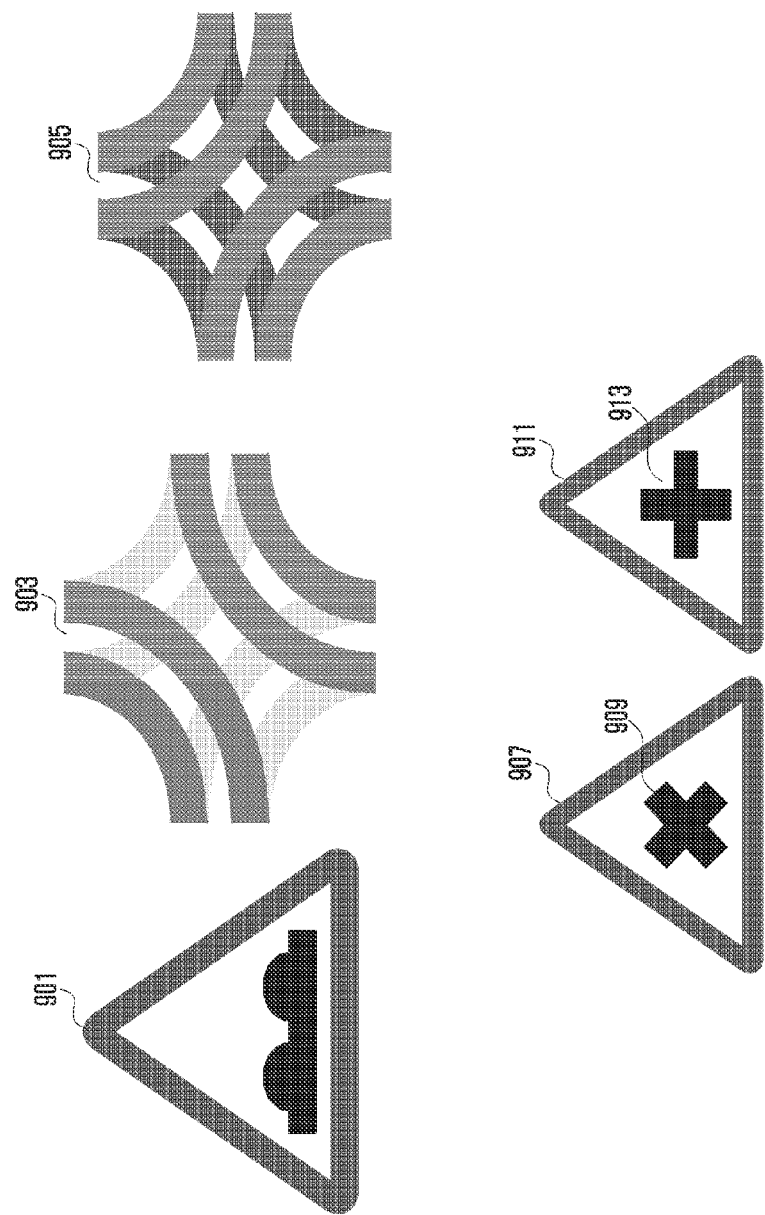
FIG. 9 illustrates an example of detecting and matching objects by using shape labels assigned to each object in a segmented region of multimedia content according to an embodiment of the present disclosure.

FIG. 9 illustrates an example of detecting and matching objects by using shape labels assigned to each object in a segmented region of the multimedia content according to an embodiment of the present disclosure.

Referring to FIG. 9, the method replaces a labeled shape region 901 with another image (say an advertisement) having the same geometric structure as the labeled shape. The method allows the user to create mash-ups that will look natural as the shape context is not deformed and creates a new aesthetic experience. If the replacement image is smaller than the size of the shape, the method scales-up the image to fit the shape. Further, the method controls the scaling of the shape by measuring the degradation in image quality by using any of the existing technique such as the Peak Signal-to-Noise Ratio (PSNR). Further, the method combines the color texture and other feature information after determining the shape. There may be many other shapes exhibiting similar signatures. For example, as shown in the figure, two logos 903 and 905 from different companies have similar shapes but with different color signatures. Hence, the method combines these shapes with color information to differentiate between shapes at a much higher granularity.

The other example shown in the figure recognizes the traffic based on the shapes displayed in the multimedia content. The image has two triangles 907 and 911 and a cross within the triangle 909 and 913. The method determines the shape of the triangles 907 and 911 as an exact match; however, the cross within the triangle is represented as a rectangular shape which the method considers as a closest match of the object. Hence, the method may replace the triangle shape containing the rectangle shape of the original image with similar shapes.

In an embodiment, the method supports an input query with shape labels that may identify the object shapes. The method searches a database of shape names in plain text to retrieve other images having the same labels. This enables the method to support image-to-shape-to-text application for efficient search and retrieval of the object shapes with shape labels.

FIG. 10 illustrates an example of detecting similar object shapes in a segmented region of the multimedia content according to an embodiment of the present disclosure.

Referring to FIG. 10, the proposed method may detect similarity in hand gestures based on the shape signature described earlier. Currently, many image features are used for gesture recognition. Popular approaches also involve part based models involving massive amount of training data. For example, the method recognizes hand gestures without any changes to the implementation. Here a "V finger" gesture 1001 and 1003 and a "thumb" gesture 1005 and 1007 are recognized without confusion even though there are slight variations between V finger gesture images and thumb finger gesture images.

Following examples depict a list of applications supported by the proposed method in the field of multimedia:

Users will be able to organize photographs in the gallery based on similarity of the shapes in the photographs.

A multimedia image may be queried based on the object shapes identified and labeled.

Allow users to create mashups and create new aesthetic experiences.

Brand advertising in personal photographs and video.

Figure 11:
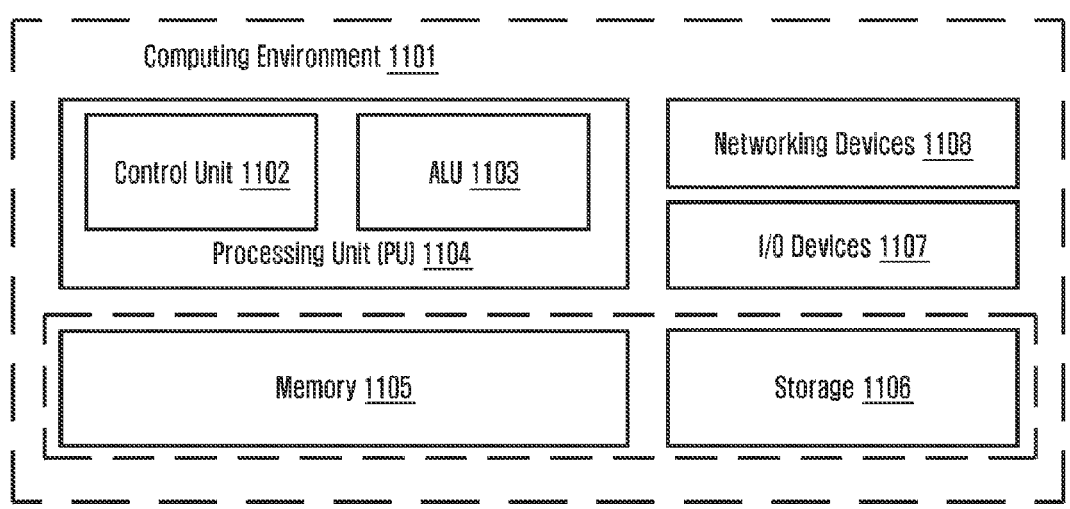
FIG. 11 illustrates a computing environment implementing a method to detect, tag, and match at least one object in a segmented region of the multimedia content using non-textural information of the at least one object in the multimedia content according to an embodiment of the present disclosure.

FIG. 11 illustrates a computing environment implementing a method to detect, tag, and replace at least one object in a segmented region of the multimedia content using a non-textural information of multimedia content according to an embodiment of the present disclosure Referring to FIG. 11, the computing environment 1101 comprises at least one processing unit 1104 that is equipped with a control unit 1102 and an Arithmetic Logic Unit (ALU) 1103, a memory 1105, a storage unit 1106, plurality of networking devices 1108 and a plurality Input/Output (I/O) devices 1107, but is not limited thereto. The processing unit 1104 is responsible for processing the instructions of the algorithm. The processing unit 1104 receives commands from the control unit in order to perform its processing. Further, any logical and arithmetic operations involved in the execution of the instructions are computed with the help of the ALU 1103.

The overall computing environment 1101 may be composed of multiple homogeneous and/or heterogeneous cores, multiple CPUs of different kinds, special media and other accelerators. The processing unit 1104 is responsible for processing the instructions of the algorithm. Further, the plurality of processing units 1104 may be located on a single chip or over multiple chips.

The algorithm comprising of instructions and codes required for the implementation are stored in either the memory unit 1105 or the storage 1106 or both. At the time of execution, the instructions may be fetched from the corresponding memory 1105 and/or storage 1106, and executed by the processing unit 1104.

In case of any hardware implementations various networking devices 1108 or external I/O devices 1107 may be connected to the computing environment to support the implementation through the networking unit and the I/O device unit.

The various embodiments disclosed herein may be implemented through at least one software program running on at least one hardware device and performing network management functions to control the elements. The elements shown in FIGS. 1, 6, 8, and 11 include blocks which may be at least one of a hardware device, or a combination of hardware device and software module.

The foregoing description of the specific various embodiments will so fully reveal the general nature of the various embodiments herein that others may, by applying current knowledge, readily modify and/or adapt for various applications such specific various embodiments without departing from the generic concept, and, therefore, such adaptations and modifications should and are intended to be comprehended within the meaning and range of equivalents of the disclosed various embodiments. It is to be understood that the phraseology or terminology employed herein is for the purpose of description and not of limitation.

While the present disclosure has been shown and described with reference to various embodiments thereof, it will be understood by those skilled in the art that various changes in form and details may be made therein without departing from the spirit and scope of the present disclosure as defined by the appended claims and their equivalents.

What is claimed is:

1. A method for detecting and monitoring of at least one object in a multimedia content, the method comprises:
    extracting at least one contour from the multimedia content using non-textural information in a segmented region within the multimedia content;
    computing a histogram for the extracted at least one contour in the segmented region of the selected multimedia content to represent an object shape based on the computed histogram; and
    determining an orientation change of the represented object shape within the segmented region of the multimedia content.

2. The method as in claim 1, further comprising:
    at least one of tracking, matching and replacing at least one object in the segmented region of the multimedia content.

3. The method as in claim 1, further comprising:
    representing a shape for the extracted at least one contour based on the computed histogram.

4. The method as in claim 1, further comprising:
    matching the orientation change of the object shape with the represented object shape.

5. The method as in claim 1, wherein the computing of the histogram comprises measuring a distance and an angle between a pair of pixels selected on the extracted at least one contour in the segmented region within the multimedia content.

6. The method as in claim 1, further comprising:
    traversing a plurality of extracted contours in one of clock-wise direction, counter-clockwise direction for computing the histogram for each contour in the plurality of extracted contours.

7. The method as in claim 5, further comprising:
    computing the histogram for at least one composite shape detected in the segmented region within the multimedia content and representing the at least one composite shape with the shape name using the computed histogram.

8. The method as in claim 6, further comprising:
    tagging a shape name for the represented object shape;
    storing the tagged shape name along with a corresponding coordinate position in the multimedia content; and
    replacing the orientation change of the represented object shape with the tagged shape name of the represented shape.

9. The method as in claim 8, wherein the determining of the orientation change of the represented shape comprises performing rotation on the tagged shape name, wherein the rotation is performed by recomputing the histogram with 360 degrees shift after quantizing angle at 1 degree space.

10. The method as in claim 1, wherein further comprising:
    tracking the at least one object in the multimedia content for identifying deformation of the at least one tracked object, and
    wherein the tracking deformation of the at least one object in a first frame from the sequence of frames comprises interpolating a feature displacement of the at least one object between the first frame and a successive video frame.

11. The method as in claim 10, further comprising:
    constraining the at least one deformed object in the successive video frame,
    wherein the method comprises constraining the at least one deformed object in the successive video frame by performing one of: scaling the deformed object in the successive video frame, transforming a geometric shape of the deformed object in the successive video frame.

12. A non-transitory computer readable storage medium with a computer program stored thereon when executed by an integrated circuit further comprising at least one processor performs a method for detecting and monitoring of at least one object in a multimedia content, the method comprising:
    extracting at least one contour from the multimedia content using non-textural information in a segmented region within the multimedia content;
    computing a histogram for the extracted at least one contour in the segmented region of the selected multimedia content to represent an object shape based on the computed histogram; and
    determining an orientation change of the represented object shape within the segmented region of the multimedia content.

13. The non-transitory computer readable storage medium as in claim 12, wherein the method further comprising performing at least one of tracking, matching, and replacing at least one object in the segmented region of the multimedia content.

14. The non-transitory computer readable storage medium in claim 12, the method further comprising:
representing a shape for the extracted at least one contour based on the computed histogram.

15. The non-transitory computer readable storage medium as in claim 12, the method further comprising:
matching the orientation changed object with the represented shape.

16. The non-transitory computer readable storage medium as in claim 12, wherein the computing of the histogram comprises measuring a distance and an angle between a pair of pixels selected on the extracted at least one contour in the segmented region within the multimedia content.

17. The non-transitory computer readable storage medium as in claim 12, the method further comprising:
traversing a plurality of extracted contours in one of clock-wise direction, counter-clockwise direction for computing the histogram for each contour in the plurality of extracted contours.

18. The non-transitory computer readable storage medium as in claim 16, the method further comprising computing the histogram for at least one composite shape detected in the segmented region within the multimedia content and represent the at least one composite shape with the shape name using the computed histogram.

19. The non-transitory computer readable storage medium as in claim 17, the method further comprising:
tagging a shape name for the representing shape;
storing the tagged shape name along with a corresponding coordinate position in the multimedia content; and
replacing the orientation change of the represented shape with the tagged shape name of the represented shape.

20. The non-transitory computer readable storage medium as in claim 19, wherein the determining of the orientation change of the represented shape comprises performing rotation on the tagged shape name, wherein the rotation is performed by recomputing the histogram with 360 degrees shift after quantizing angle at 1 degree space.

\* \* \* \* \*